(12) United States Patent
Ciochetti, Sr.

(10) Patent No.: US 8,056,156 B2
(45) Date of Patent: Nov. 15, 2011

(54) VACUUM RELIEF UNIT AND METHOD FOR A POOL

(76) Inventor: Michael J. Ciochetti, Sr., Clayton, GA (US)

( * ) Notice: Subject to any disclaimer, the term of this patent is extended or adjusted under 35 U.S.C. 154(b) by 852 days.

(21) Appl. No.: 11/834,454

(22) Filed: Aug. 6, 2007

(65) Prior Publication Data

US 2008/0029164 A1 Feb. 7, 2008

Related U.S. Application Data

(60) Provisional application No. 60/821,466, filed on Aug. 4, 2006.

(51) Int. Cl.
*E04H 4/06* (2006.01)
*F16K 24/02* (2006.01)
*F16K 15/06* (2006.01)
*F16K 17/00* (2006.01)
*F16K 21/04* (2006.01)

(52) U.S. Cl. .......... 4/504; 4/509; 137/217; 137/512; 137/514.5; 137/613; 137/907; 251/55

(58) Field of Classification Search .......... 137/493, 137/907, 572, 613, 217, 614.2, 514, 514.5, 137/512, 512.3; 220/203.28; 4/498, 504, 4/509; 251/55
See application file for complete search history.

(56) References Cited

U.S. PATENT DOCUMENTS

| | | | | |
|---|---|---|---|---|
| 4,232,704 A | * | 11/1980 | Becker et al. | 137/218 |
| 5,038,814 A | * | 8/1991 | Gayton et al. | 137/218 |
| 5,265,631 A | | 11/1993 | Goettl | |
| 5,477,879 A | * | 12/1995 | Vos | 137/513.5 |
| 5,511,575 A | * | 4/1996 | Andenmatten et al. | 137/43 |
| 5,682,624 A | | 11/1997 | Ciochetti | |
| 5,865,601 A | | 2/1999 | Miller | |
| 6,022,481 A | | 2/2000 | Blake | |
| 6,251,285 B1 | * | 6/2001 | Ciochetti | 210/741 |
| 2005/0092946 A1 | | 5/2005 | Fellington et al. | |

* cited by examiner

*Primary Examiner* — John Rivell
*Assistant Examiner* — Atif Chaudry
(74) *Attorney, Agent, or Firm* — Hartman & Hartman, P.C.; Gary M. Hartman; Domenica N. S. Hartman

(57) ABSTRACT

A vacuum relief unit and method for venting air into a pool pumping system when a pressure level within the system drops below a first pressure level limit. The unit includes a closed air chamber, a device for venting chamber air from the air chamber into the pool pumping system when the pressure level in the pool pumping system drops below the first pressure level limit, a device for venting atmospheric air into the air chamber when the pressure level within the air chamber drops below a second pressure level limit that is lower than the first pressure level limit, and a device for delaying operation of the atmospheric air venting device when the pressure within the air chamber is no longer below the second pressure level limit.

20 Claims, 2 Drawing Sheets

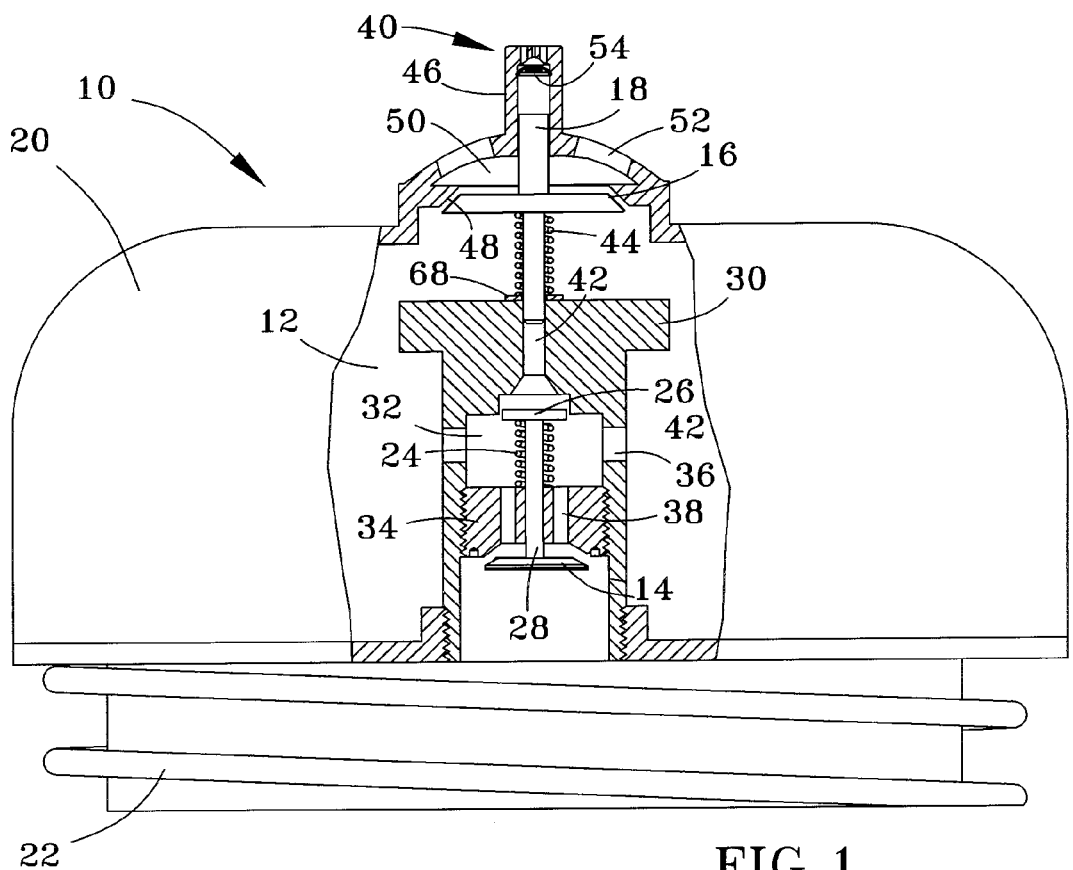
FIG. 1
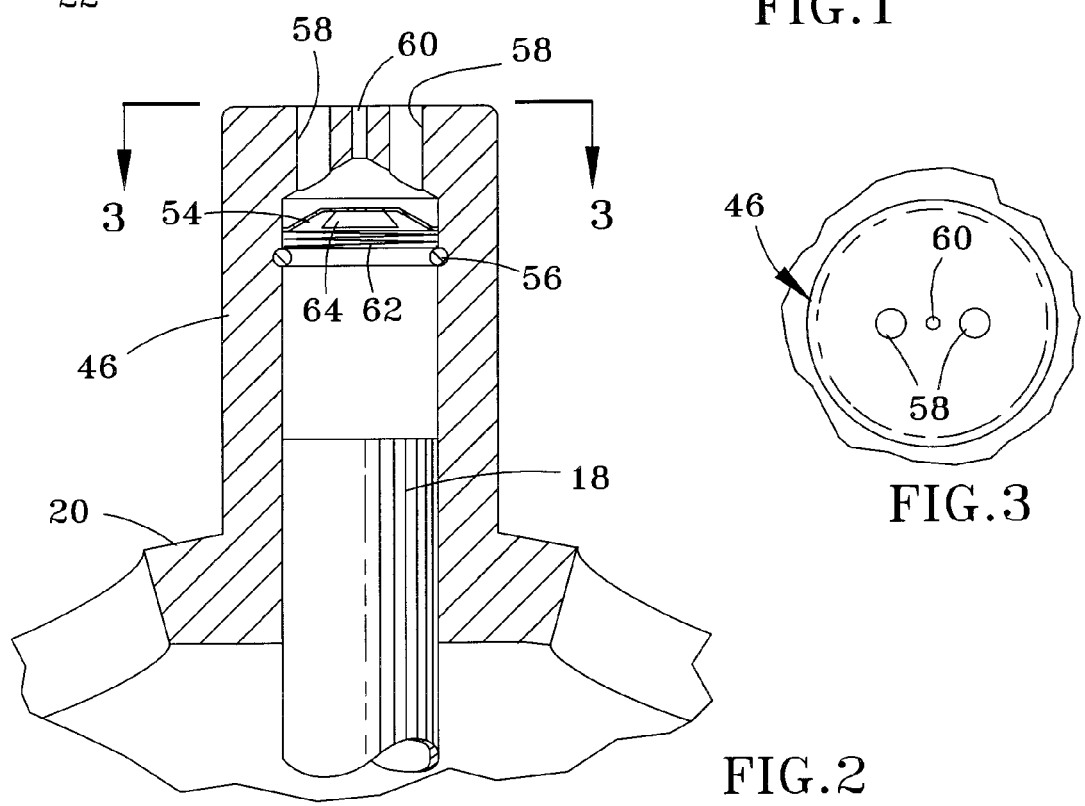
FIG. 2
FIG. 3

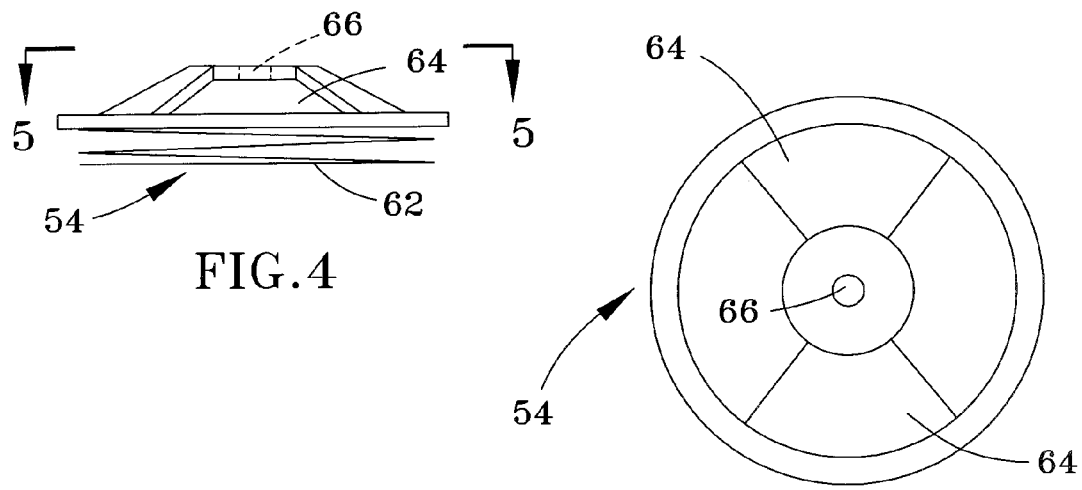
FIG.4
FIG.5
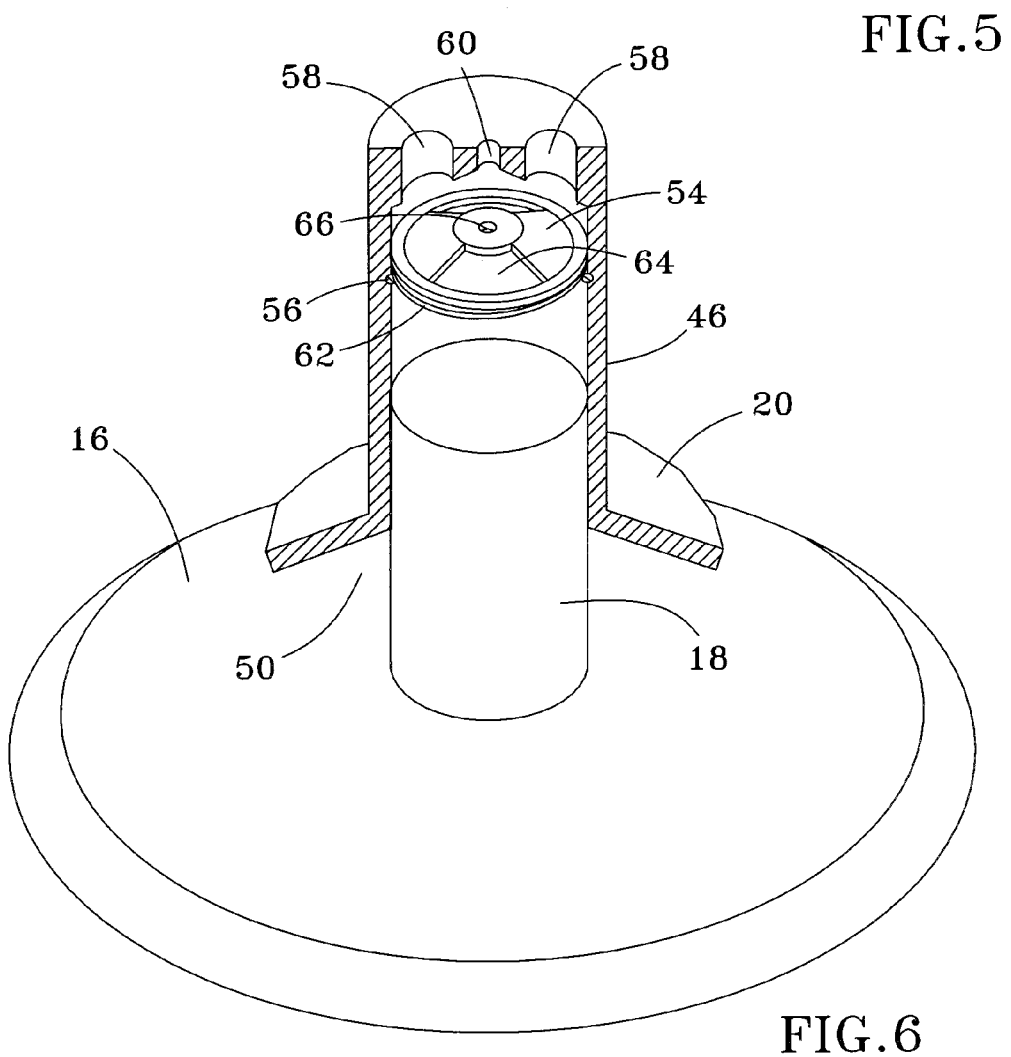
FIG.6

VACUUM RELIEF UNIT AND METHOD FOR A POOL

CROSS REFERENCE TO RELATED APPLICATIONS

This application claims the benefit of U.S. Provisional Application No. 60/821,466, filed Aug. 4, 2006, the contents of which are incorporated herein by reference. In addition, this application is related to U.S. Pat. Nos. 5,682,624 and 6,251,285, both to Ciochetti and both incorporated herein by reference.

BACKGROUND OF THE INVENTION

The present invention generally relates to pool safety equipment. More particularly, this invention relates to a method and unit for preventing an obstruction from being trapped by suction to an inlet of a pool filter pump system. The unit can be mounted directly to a skimmer lid of the pool filter pump system, and operates to vent air into the system when a vacuum level within the system exceeds a specified vacuum limit, as is the case if the drain or another inlet connected to the system is partially or completely obstructed, such as by a child or foreign object.

To maximize enjoyment and maintain proper sanitary conditions, swimming pools must be constantly cleaned of debris, dirt and other contaminants. Such a requirement is particularly demanding in the case of commercial pools and hot tubs that are likely to be used by a large number of people. For most pools and tubs (hereinafter simply referred to as pools for convenience), the primary task of cleaning is performed by a filter pump system that continuously draws water through a drain located at the bottom of the pool, typically at or near its deepest point, and through a number of suction lines located elsewhere, typically along the perimeter of the pool. As with all pools, but particularly commercial pools, a high rate of water flow must be achieved through a suitable filtering medium in order to maintain an acceptable level of cleanliness. Consequently, a high capacity pump must be employed to draw the water from the pool, with a relatively larger pump generally being required as the size of the pool increases.

A significant hazard with the use of such large filter pumps is the potential for individuals and particularly children to become drawn and trapped against the drain or a suction line as a result of the vacuum created by the pump when the drain or suction line inlet is obstructed. Occurrences of this type of accident have caused the pool industry to look for solutions. One approach has been to modify the drain construction, examples of which include U.S. Pat. No. 4,658,449 to Martin, directed to a protective adapter for covering a pool drain, and U.S. Pat. No. 3,940,807 to Baker et al., directed to modifying the drain opening itself in order to more uniformly distribute the flow of water toward the center of the drain. While such approaches may be acceptable for many pool applications, a solution that is capable of being retrofitted to an existing pool without altering the appearance, size or construction of the drain is often more desirable and practical. Furthermore, these solutions only reduce the suction level at the drain, and safer operation of a pool can be achieved if the dangerous suction condition at the pool drain is completely eliminated if the drain is obstructed by a child.

As a solution, vacuum relief valves and units for preventing a child or an object from being trapped by suction to a drain or any other suction line are taught in U.S. Pat. Nos. 5,682,624 and 6,251,285 to Ciochetti. The valve taught by U.S. Pat. No. 5,682,624 is configured for mounting directly to a suction line between a drain or suction line and the filter pump, while the valve taught by U.S. Pat. No. 6,251,285 is configured for installation as a lint trap cover on an otherwise conventional lint trap unit located upstream of a pool filter pump. Both valves generally operate by causing the filter pump to quickly lose its prime when a child or object obstructs or becomes trapped against the drain or suction line inlet, so that the vacuum created by the filter pump is completely eliminated. In particular, the valves permit air to rapidly flow into the drain and suction lines if a predetermined vacuum level is exceeded within these lines, as is the case if the drain or one of the pool's suction line inlets becomes partially or completely obstructed. The rapid influx or venting of air eliminates the vacuum within the lines and, therefore, the resulting unsafe condition. The response of the valve is preferably damped such that the valve will remain open sufficiently long to cause the filter pump to completely lose its prime.

Operational aspects of certain vacuum relief valves currently on the market include the ability to be locked in the open (venting) position to allow for the release of an obstruction without time constraints. Such valves do not reset themselves, but must be manually reset in order for the pump to return to normal operation. However, a valve can be unnecessarily actuated by a transient vacuum spike (pressure drop), for example, during pump startup, and certain valves may have a tendency to rapidly open and close during pump startup. Furthermore, pump damage can occur if the pump continues to run when the valve is locked open and continues to vent air into the pump.

BRIEF SUMMARY OF THE INVENTION

The present invention provides a vacuum relief unit and method for venting air into a pool pumping system when a pressure level within the system drops below a pressure level limit.

According to a first aspect of the invention, the unit includes a closed air chamber containing chamber air, a device for venting the chamber air from the air chamber into the pool pumping system when the pressure level in the pool pumping system drops below the first pressure level limit, a device for venting atmospheric air into the air chamber when the pressure level within the air chamber drops below a second pressure level limit that is lower than the first pressure level limit, and a device for delaying operation of the atmospheric air venting device when the pressure within the air chamber is no longer below the second pressure level limit so that atmospheric air continues to be vented into the air chamber by the atmospheric air venting device after the pressure in the air chamber is no longer below the second pressure level limit.

According to a second aspect of the invention, the method involves venting chamber air from an otherwise closed air chamber into the pool pumping system when the pressure level in the pool pumping system drops below the first pressure level limit, venting atmospheric air into the air chamber when the pressure level within the air chamber drops below a second pressure level limit that is lower than the first pressure level limit, and delaying operation of the atmospheric air venting device when the pressure within the air chamber is no longer below the second pressure level limit so that atmospheric air continues to be vented into the air chamber by the atmospheric air venting device after the pressure in the air chamber is no longer below the second pressure level limit.

According to preferred aspects of the invention, the vacuum relief unit addresses a number of operational issues of vacuum relief valves. First, the vacuum relief unit is operable to vent air into a pumping system for a sufficient time to clear an obstruction, but without necessarily being locked in the open (venting) position. Second, the unit is able to absorb transient vacuum spikes (pressure drops), and as a result does not unnecessarily vent sufficient air into the pumping system to lose prime during pump startup and other normal transient conditions. Third, the unit is able to reset itself in the closed position after an obstruction has been cleared or otherwise after the unit has vented air into the pumping system. Another preferred aspect of the unit is that it can be readily installed as a separate unit in a skimmer, and therefore is simple to install and more financially accessible to individuals who own private pools.

Other objects and advantages of this invention will be better appreciated from the following detailed description.

BRIEF DESCRIPTION OF THE DRAWINGS

FIG. 1 is a fragmentary cross-sectional view of a vacuum relief unit in accordance with an embodiment of this invention.

FIGS. 2 and 3 represent cross-sectional and plan views of a pump priming delay mechanism of the vacuum relief unit of FIG. 1.

FIGS. 4 and 5 are cross-sectional and plan views of a flutter valve of the pump priming delay mechanism of FIGS. 2 and 3.

FIG. 6 is a fragmentary cross-sectional view of the pump priming delay mechanism shown in FIGS. 2 and 3.

DETAILED DESCRIPTION OF THE INVENTION

A vacuum relief unit 10 is represented in the Figures as comprising an air chamber 12 defined by a dome-shaped housing 20, two diaphragms 14 and 16 that operate in series within the housing 20, and a piston 18 also within the housing 20. The housing 20 is configured to be installed in the cover of a pool lint trap (not shown) connected to a pumping system of a pool, hot tub, etc., and is provided with threads 22 at a lower end thereof to permit the housing 20 to be threaded into an opening formed in a conventional lint trap cover. However, it should be understood that the unit 10 is not limited to this type of installation.

From FIG. 1, it is evident that the first and second diaphragms 14 and 16 are not mechanically coupled to each other. The first diaphragm 14 operates to seal the chamber 12 from a suction line of a pool (not shown) to which the lint trap is connected, and only opens to permit venting of air within the chamber 12 to the suction line if a sufficiently low subatmospheric pressure level is reached in the suction line. (For purposes of clarity, relative levels of vacuum will be discussed in terms of pressure (relative to absolute zero pressure), so as not to confuse what is meant by a "low" or "high" vacuum level.) The pressure level at which venting occurs is determined by a spring 24 mounted to a post 28 on which the diaphragm 14 and spring 24 are mounted. The diaphragm 14 is normally closed against a web 34 under the force of the spring 24, whose force holding the diaphragm 14 closed can be made adjustable with a fastener 26 secured to the end of the post 28. The diaphragm 14 and its support assembly (post 28, spring 24, and fastener 26) are housed within a cavity 32 formed by a boss 30 that extends into the air chamber 12. The post 28 can be seen as disposed within a passage in the web 34, which serves as a seat for the diaphragm 14. Vent holes 36 and 38 are provided in the web 34 and in the walls of the boss 30 to allow air to flow from the air chamber 12 and past the diaphragm 14 when the diaphragm 14 is not seated against the web 34 (as shown in FIG. 1).

The second diaphragm 16 seals the air chamber 12 from atmospheric air outside the housing 20, and only opens to permit air from the atmosphere to vent into the chamber 12 if a sufficiently low pressure level is reached in the chamber 12. According to a preferred embodiment of the invention, the pressure level in the air chamber 12 required to actuate the diaphragm 16 is lower than the pressure level in the suction line required to actuate the diaphragm 14. Furthermore, the chamber 12 is preferably of sufficient size to act as a buffer for absorbing brief pressure drops during pump startup. As a result, the second diaphragm 16 is able to remain closed while the first diaphragm 14 is open for a brief period of time.

Similar to the first diaphragm 14, the pressure level at which venting is allowed to occur through the second diaphragm 16 is determined by a compression spring 44 mounted on the piston 18, on which the diaphragm 16 and spring 44 are also mounted. The diaphragm 16 is normally closed against the web 48 under the force of the spring 44, whose force holding the diaphragm 16 closed can be made adjustable, for example, with one or more spacers 68 between the lower end of the spring 44 and the boss 30. As will become evident below, the opening and closing of the diaphragm 16 determines when air is vented to a pumping system. For this reason, it will typically be useful to adjust the spring load provided by the spring 44 with a vacuum gauge to optimize the operation of the unit 10 for the capacity of a given pumping system.

The piston 18 on which the diaphragm 16 is mounted is received and free to reciprocate within a bore 42 at the upper end of the boss 30. The upper end of the piston 18 is received and reciprocates within a cylinder 46, represented as being defined by an upper protuberance on the housing 20. The diaphragm 16 can be seen as being operable to close against a seat defined by a web 48, which delineates a second cavity 50 between the air chamber 12 and the cylinder 46. Vent holes 52 connect the second cavity 50 to atmospheric air, so that the second cavity 50 remains at atmospheric conditions at all times. FIG. 1 represents the condition in which a sufficiently low pressure within the air chamber has unseated the diaphragm 16 from the web 48, allowing air to flow from the surrounding atmosphere through the vent holes 52, into the second cavity 50, past the diaphragm 16, and into the air chamber 12.

Together, the diaphragm 16, piston 18, cylinder 46, and web 48 are components of what is termed herein a pump priming delay mechanism 40, shown in greater detail in FIGS. 2 through 6. The piston 18 prevents the second diaphragm 16 from reclosing too quickly, ensuring that atmospheric air continues to be supplied to the air chamber 12 and the suction line in the event that a sufficiently low pressure is sustained in the pumping system for a sufficiently long duration (for example, a sustained obstruction) to unseat the diaphragm 14 and then unseat the diaphragm 16. In effect, though the diaphragm 16 is adapted to open and close at lower pressure levels than the diaphragm 14, the diaphragm 16 will not prematurely close as the pressure level rises above the pressure level required to close the diaphragm 16, but instead gradually closes as the pressure level approaches (or exceeds) the pressure level required to close the diaphragm 14.

To achieve the above functionality, FIGS. 2 and 6 shown the travel of the piston 18 into the cylinder 46 as being resisted by a flutter valve 54 at the upper end of the cylinder 46. The flutter valve 54 is retained at the upper end of the cylinder 46 by a retaining lip 56, and is biased by a spring 62 to normally close a pair of intake vents 58 at the top of the cylinder 46. A pair of intake holes 64 are formed in the flutter valve 54 so as not to be aligned with the intake vents 58 of the cylinder 46. The nonalignment of the intake vents 58 and holes 64 can be maintained by preventing the flutter valve 54 from rotating within the cylinder 46, such as with complementary axially-oriented features (not shown) on the cylinder 46 and valve 54. A bleed vent 60 formed at the upper end of the cylinder 46 remains open when the intake holes 58 are closed by the flutter valve 54 as a result of a bleed hole 66 formed in the valve 54 to be aligned with the bleed vent 60 in the cylinder 46.

When a vacuum within the pumping system causes the first diaphragm 14 to travel downward and vent air from the air chamber 12 into the pumping system, the diaphragm 16 initially remains closed as a result of requiring a lower pressure level for actuation. Accordingly, if the vacuum drop (pressure decrease) in the pumping system is not sufficiently low or of sufficient duration, air is only drawn from the air chamber 12. Once the diaphragm 14 recloses, inherent air leakage through the diaphragm 16 gradually allows the air chamber 12 to return to atmospheric conditions.

If the pressure level within the pumping system is sufficiently low and of sufficient duration, the pressure level within the air chamber 12 will eventually cause the second diaphragm 16 to travel downward, unseating the diaphragm 16 from the web 48 and allowing atmospheric air to be vented into the chamber 12. The corresponding downward travel of the piston 18 draws atmospheric air into the cylinder 46 through the intake vents 58 in the cylinder and the intake holes 64 in the flutter valve 54. In the event that the low pressure level is sustained, sufficient air is vented through the diaphragm 16, air chamber 12, and diaphragm 14 to cause the pumping system to lose its prime, allowing any obstruction that might have caused the pressure drop to be freed from the drain/suction line of the pool. In the event that the obstruction can be freed before the pumping system loses its prime, the pressure level is likely to rapidly rise within the air chamber 12, prompting the second diaphragm 16 to rapidly travel upward under the force of the spring 44 to engage the web 48 and block the flow of atmospheric air into the chamber 12. The correspondingly rapid upward stroke of the piston 18 compresses the air within the cylinder 46, forcing the flutter valve 54 upward to close the intake holes 58 so that further travel of the piston 18 (and therefore the second diaphragm 16) is delayed as the remaining air within the cylinder 46 is vented to atmosphere through the bleed hole 64 in the valve 54 and the bleed vent 60 in the cylinder 46.

While the invention has been described in terms of a specific embodiment, it is apparent that other forms could be adopted by one skilled in the art. For example, it is well within the capability of those skilled in the art to alter the physical configuration of the vacuum relief unit 10 from that shown, and employ various materials and processes to make and assemble the individual components of the unit 10. Therefore, the scope of the invention is to be limited only by the following claims.

The invention claimed is:

1. A vacuum relief unit for venting air into a pool pumping system when a pressure level within the pool pumping system drops below a first pressure level limit, the vacuum relief unit comprising:

an air chamber that is closed to contain chamber air, sealed from the pool pumping system by a chamber air venting means, and sealed from atmospheric air by an atmospheric air venting means when water is flowing through the pool pumping system;

the chamber air venting means being biased to seal the air chamber from the pool pumping system when the pressure level in the pool pumping system is at or above the first pressure level limit and being adapted to vent the chamber air from the air chamber into the pool pumping system when the pressure level in the pool pumping system drops below the first pressure level limit;

the atmospheric air venting means being biased to seal the air chamber from atmospheric air surrounding the vacuum relief unit when the pressure level in the air chamber is at or above a second pressure level limit that is lower than the first pressure level limit and being adapted to vent atmospheric air into the air chamber when the pressure level within the air chamber drops below the second pressure level limit and is therefore lower than the first pressure level limit; and means for delaying operation of the atmospheric air venting means when the pressure within the air chamber is no longer below the second pressure level limit so that atmospheric air continues to be vented into the air chamber by the atmospheric air venting means after the pressure in the air chamber is no longer below the second pressure level limit.

2. A vacuum relief unit according to claim 1, wherein the chamber air venting means comprises a diaphragm and at least one hole that is opened and closed by the diaphragm.

3. A vacuum relief unit according to claim 1, wherein the atmospheric air venting means comprises a diaphragm and at least one hole that is opened and closed by the diaphragm.

4. A vacuum relief unit according to claim 1, wherein the chamber air venting means comprises a first diaphragm, the atmospheric air venting means comprises a second diaphragm that is not mechanically coupled to the first diaphragm, and the first and second diaphragms are in series.

5. A vacuum relief unit according to claim 1, wherein the chamber air venting means automatically stops venting to the pool pumping system if the pressure level in the pool pumping system in the pool pumping system rises sufficiently above the first pressure level limit.

6. A vacuum relief unit according to claim 1, wherein the atmospheric air venting means automatically stop venting to the air chamber if the pressure level in the air chamber rises sufficiently above the second pressure level limit.

7. A vacuum relief unit according to claim 1, wherein the air chamber is of sufficient volume to absorb a transient drop in the pressure level within the pool pumping system.

8. A vacuum relief unit according to claim 1, wherein the delaying means comprises a cylinder, a piston reciprocable within the cylinder, openings in the cylinder that freely allow air to enter the cylinder as the piston is being withdrawn from the cylinder, and means for inhibiting air from leaving the cylinder through the openings when the piston is being inserted into the cylinder.

9. A vacuum relief unit according to claim 8, wherein the atmospheric air venting means comprises a diaphragm mounted on the piston so as to reciprocate therewith, the diaphragm increasingly venting atmospheric air into the air chamber as the piston is increasingly withdrawn from the cylinder, the diaphragm increasingly inhibiting the venting of atmospheric air into the air chamber as the piston is increasingly inserted into the cylinder.

10. A vacuum relief unit according to claim 9, wherein the atmospheric air venting means further comprises a bleed hole that allows air to enter and leave the cylinder regardless of the position of the piston within the cylinder.

11. A vacuum relief unit according to claim 1, wherein the vacuum relief unit is configured to be installed in a lint trap cover.

12. A vacuum relief unit according to claim 1, wherein the vacuum relief unit is installed in a lint trap cover.

13. A method of venting air into a pool pumping system when a pressure level within the pool pumping system drops below a first pressure level limit, the method comprising:
   providing an air chamber that is closed to contain chamber air and is sealed from the pool pumping system and from atmospheric air while water is flowing through the pool pumping system;
   venting chamber air from the air chamber into the pool pumping system when the pressure level in the pool pumping system drops below the first pressure level limit;
   venting atmospheric air into the air chamber when the pressure level within the air chamber drops below a second pressure level limit that is lower than the first pressure level limit; and
   delaying operation of the atmospheric air venting means when the pressure within the air chamber is no longer below the second pressure level limit so that atmospheric air continues to be vented into the air chamber by the atmospheric air venting means after the pressure in the air chamber is no longer below the second pressure level limit.

14. A method according to claim 13, wherein the chamber air is vented through at least one hole normally closed by a first diaphragm, the atmospheric air is vented through at least one hole normally closed by a second diaphragm that is not mechanically coupled to the first diaphragm, and the first and second diaphragms are in series.

15. A method according to claim 13, wherein venting of the chamber air to the pool pumping system automatically stops if the pressure level in the pool pumping system in the pool pumping system rises sufficiently above the first pressure level limit.

16. A method according to claim 13, wherein venting of the atmospheric to the air chamber automatically stops if the pressure level in the air chamber rises sufficiently above the second pressure level limit.

17. A method according to claim 13, wherein the air chamber is of sufficient volume to absorb a transient drop in the pressure level within the pool pumping system.

18. A method according to claim 13, wherein the delaying step is performed by a cylinder, a piston reciprocable within the cylinder, openings in the cylinder that freely allow air to enter the cylinder as the piston is being withdrawn from the cylinder, and means for inhibiting air from leaving the cylinder through the openings when the piston is being inserted into the cylinder.

19. A method according to claim 18, wherein a diaphragm mounted on the piston increasingly vents atmospheric air into the air chamber as the piston is increasingly withdrawn from the cylinder, and increasingly inhibits venting of atmospheric air into the air chamber as the piston is increasingly inserted into the cylinder.

20. A method according to claim 13, further comprising the step of installing the vacuum relief unit in a lint trap cover.

* * * * *